United States Patent Office 2,709,545
Patented May 31, 1955

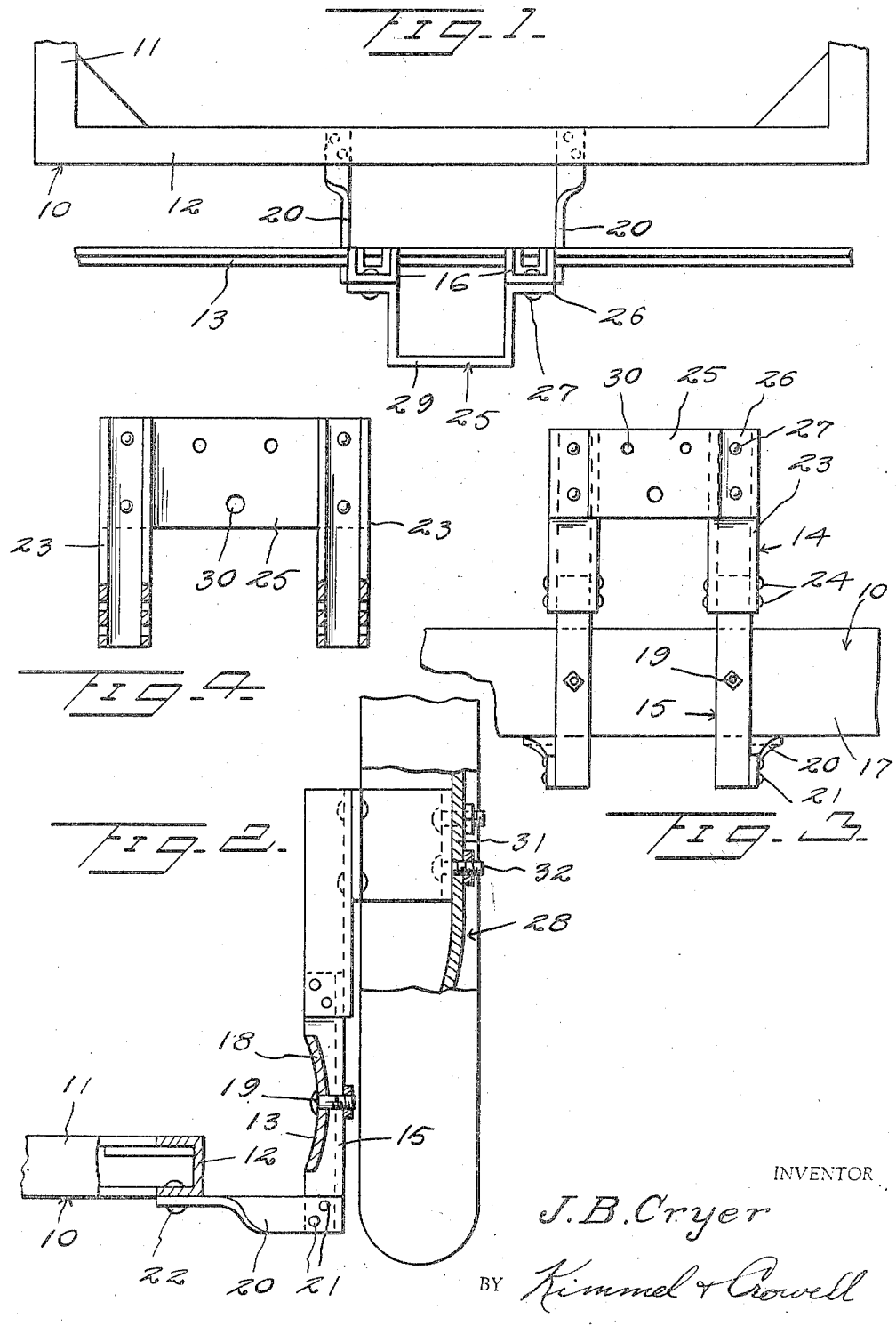

2,709,545

TIRE CARRIER

James B. Cryer, Buffalo, N. Y.

Application January 25, 1954, Serial No. 405,764

2 Claims. (Cl. 224—42.04)

This invention relates to a tire carrier or rack.

An object of this invention is to provide a tire carrier or rack for mounting on the rear bumper of a vehicle.

Another object of this invention is to provide a tire carrier or rack which will firmly hold a spare tire on the bumper so that the spare tire will act as a pneumatic bumper.

A further object of this invention is to provide a tire carrier or rack which includes means for reinforcing the central portion of the bumper in addition to bracing the carrier.

With the above and other objects in view, my invention consists in the arrangement, combination and details of construction disclosed in the drawing and specification, and then more particularly pointed out in the appended claims.

In the drawing:

Figure 1 is a plan view of a tire carrier or rack constructed according to an embodiment of this invention secured to the rear bumper and the chassis of a vehicle.

Figure 2 is a detailed side elevation, partly broken away and in section, of the carrier.

Figure 3 is a detailed rear elevation of the carrier.

Figure 4 is a detailed front elevation, partly broken away and in section, of the upper portion of the carrier.

Referring to the drawing, the numeral 10 designates generally a vehicle chassis having side frame members 11 and a transverse rear member 12. The vehicle chassis 10 has secured to the rear thereof a resilient bumper 13 which is secured to the chassis 10 in a conventional manner.

In order to provide a means whereby a spare tire may be supported on the exterior of the vehicle, so as to thereby increase the useful area or space within the trunk portion of the vehicle, I have provided a spare tire rack or carrier which is formed of a pair of upright parallel channel members generally indicated at 14.

The channel members 14 are of like construction and each includes a lower channel member 15 having the parallel sides 16 thereof confronting the rear convex side 17 of the bumper 13. The parallel sides 16 are cut out, as indicated at 18, so that the side members 16 of the lower channel members 15 will snugly receive the bumper 13. Each lower channel member 15 is secured to the bumper 13 by means of one or more fastening members 19.

A bracing bar 20 is secured by fastening means 21 to the lower projecting end of the channel member 15, and is extended forwardly beneath the transverse frame member 12, as indicated at Figure 2, and secured to the frame member 12 by fastening means 22.

The lower channel members 15 have secured to the upper ends thereof upper channel members 23 which overlap the upper ends of the lower channel members 15 and are secured thereto by fastening means 24.

By forming the channel members 14 of two overlapping channel members, such as 15 and 23, the lower channel members 15 may be made to conform to the particular transverse shape or configuration of the bumper of a particular make of vehicle, and the upper bars 23 may be made as standard parts for attachment to the lower channel members 15 which are specially made for particular vehicles and vehicle bumpers.

A U-shaped member 25, having outwardly extending flanges 26, is secured by fastening means 27 to the upper ends of the upper channel members 23 and provides a supporting means for a spare tire 28. The rear bight portion 29 of the U-shaped member 25 has secured thereto a plurality of bolts or studs 30 on which the disk 31 of the spare tire 28 may be firmly secured.

In the use of this tire carrier, the lower channel members 15, which are shaped on their forward parallel sides 16 to conform to the transverse shape of the bumper 13, are secured by the fastening means 19 to the bumper 13.

The lower bracing bars 20 are secured by the fastening means 22 to the transverse rear connecting bar 12 of the vehicle chassis 10.

The upper unit formed by the upper channel members 23, and the U-shaped member 25, are secured by the fastening means 24 to the lower channel members 15.

The vehicle tire or wheel 28 will be supported rearwardly of the body of the vehicle in a position whereby the trunk door may be readily opened, and it will be understood that a license plate with a light normally associated therewith may be secured to the rear side of the wheel 28. This may be accomplished by providing a hollow stud, such as the lower stud 32, disposed in the center portion of the disk 31.

With a tire carrier or rack as hereinbefore described, the spare tire may be positioned on the outside of the vehicle body and the tire itself will form a pneumatic cushion or bumper associated with the bumper 13 so as to take up any shocks occasioned by contact of the rear of the vehicle with the bumper or other portion of another vehicle.

What is claimed is:

1. A tire carrier for attachment to the rear bumper of a vehicle comprising a pair of upright channel members having the parallel sides thereof facing towards the forward portion of said vehicle, the lower ends of said members projecting below the bumper, means securing said members to the bumper, forwardly projecting bracing bars fixed to the lower ends of said members, means securing said bracing bars to the vehicle chassis, a U-shaped rearwardly projecting member projecting rearwardly of said vehicle, fixed to the upper ends of said channel members, and bolts carried by said U-shaped member for supporting a tire and wheel.

2. A tire carrier for attachment to the rear bumper of a vehicle comprising a pair of upright channel members having the parallel sides thereof facing towards the forward portion of said vehicle, the lower ends of said members projecting below the bumper, each of said members being formed of overlapping upper and lower channels, means securing said channels together, forwardly projecting bracing bars fixed to the lower ends of said members, means securing said bracing bars to the vehicle chassis, a U-shaped rearwardly projecting member projecting rearwardly of said vehicle, fixed to the upper ends of said channel members, and bolts carried by said U-shaped member for supporting a tire and wheel.

References Cited in the file of this patent

UNITED STATES PATENTS

| | | |
|---|---|---|
| 1,297,942 | Wahrenberger | Mar. 18, 1914 |
| 1,701,210 | Mach | Feb. 5, 1929 |
| 2,592,050 | McCharen | Apr. 8, 1952 |
| 2,640,635 | Garrett | June 2, 1953 |